United States Patent
Bakhsh et al.

(10) Patent No.: US 7,296,822 B2
(45) Date of Patent: Nov. 20, 2007

(54) INFLATABLE WINDSHIELD CURTAIN

(75) Inventors: Ali Emam Bakhsh, Rochester Hills, MI (US); Al A. Saberan, New Baltimore, MI (US); Ayad E. Nayef, Sterling Hts., MI (US); Suk J. Ham, Rochester Hills, MI (US); Rico Scott Bertossi, Richmond, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 305 days.

(21) Appl. No.: 10/431,195

(22) Filed: May 7, 2003

(65) Prior Publication Data

US 2004/0100074 A1 May 27, 2004

Related U.S. Application Data

(63) Continuation-in-part of application No. 10/301,966, filed on Nov. 22, 2002, now Pat. No. 7,000,944.

(51) Int. Cl.
*B60R 21/16* (2006.01)
(52) U.S. Cl. ................. 280/730.1; 280/743.1
(58) Field of Classification Search ............ 280/730.1, 280/730.2, 749, 743.1, 732, 728.1
See application file for complete search history.

(56) References Cited

U.S. PATENT DOCUMENTS

| | | | |
|---|---|---|---|
| 2,755,125 A | 7/1956 | Hodges | |
| 2,806,737 A | 9/1957 | Maxwell | |
| 2,834,606 A * | 5/1958 | Bertrand | 280/730.1 |
| 3,642,303 A | 2/1972 | Irish et al. | |
| 3,664,682 A | 5/1972 | Wycech | |
| 3,795,412 A | 3/1974 | John | |
| 4,169,613 A | 10/1979 | Barnett | |
| 5,048,863 A * | 9/1991 | Henseler et al. | 280/743.1 |
| 5,470,103 A | 11/1995 | Vaillancourt et al. | |
| 5,584,508 A * | 12/1996 | Maruyama et al. | 280/743.1 |
| 5,602,734 A | 2/1997 | Kithil | |
| 6,106,000 A | 8/2000 | Stewart | |
| 6,113,132 A | 9/2000 | Saslecov | |

(Continued)

FOREIGN PATENT DOCUMENTS

DE  29916526  3/2000

(Continued)

*Primary Examiner*—Ruth Ilan
(74) *Attorney, Agent, or Firm*—Tarolli, Sundheim, Covell & Tummino LLP (57) ABSTRACT

Apparatus (10) for helping to protect an occupant of a vehicle (12) includes an inflatable windshield curtain (14) inflatable away from the vehicle roof (40) to a position between the windshield (50) and a vehicle occupant. The windshield curtain (14) includes overlying panels (80 and 82) interconnected to define an inflatable volume (110) of the windshield curtain. The windshield curtain (14) includes a pleated portion in which at least one of the panels (80 and 82) has portions folded over to form at least one pleat (150) in the panel. In one embodiment, the windshield curtain (14) includes connections (154 and 180) that interconnect overlying folded portions of the at least one panel (80 and 82) along the at least one pleat (150). Portions of the at least one pleat between the connections (150 and 180) are unfoldable to allow expansion of the pleated portion upon inflation of the windshield curtain (14).

14 Claims, 8 Drawing Sheets

U.S. PATENT DOCUMENTS

| | | |
|---|---|---|
| 6,224,088 B1 | 5/2001 | Lohavanijaya |
| 6,250,668 B1 | 6/2001 | Breed et al. |
| 6,431,586 B1 | 8/2002 | Eyrainer et al. |
| 6,467,563 B1 | 10/2002 | Ryan et al. |
| 2003/0052476 A1 | 3/2003 | Rose |

FOREIGN PATENT DOCUMENTS

| | | | |
|---|---|---|---|
| DE | 198 60 827 A1 | * | 7/2000 |
| DE | 101 15 064 A1 | * | 11/2002 |
| FR | 2824029 | * | 10/2002 |
| JP | 10-35381 A | * | 2/1998 |

* cited by examiner

INFLATABLE WINDSHIELD CURTAIN

RELATED APPLICATION

This application is a continuation-in-part of U.S. patent application Ser. No. 10/301,966, filed Nov. 22, 2002 now U.S. Pat. No. 7,000,944.

FIELD OF THE INVENTION

The present invention relates to an apparatus including an inflatable vehicle occupant protection device for helping to protect a vehicle occupant upon the occurrence of an event such as a vehicle collision and/or a vehicle rollover.

BACKGROUND OF THE INVENTION

It is known to inflate an inflatable vehicle occupant protection device to help protect a vehicle occupant upon the occurrence of an event such as a vehicle collision or rollover. One particular type of inflatable vehicle occupant protection device is an inflatable driver or passenger air bag that is inflatable between the occupant and an instrument panel and/or steering wheel of the vehicle. Another type of inflatable vehicle occupant protection device is an inflatable side curtain that inflates away from the vehicle roof to a position between the vehicle occupant and a side structure of the vehicle. Other known types of inflatable vehicle occupant protection devices include seat-mounted side impact air bags, inflatable knee bolsters, and inflatable seat belts. The known inflatable vehicle occupant protection devices are inflated from a deflated condition by inflation fluid provided by an inflator.

SUMMARY OF THE INVENTION

The present invention relates to an apparatus for helping to protect an occupant of a vehicle that has a roof and a windshield. The apparatus includes an inflatable windshield curtain inflatable away from the vehicle roof to a position between the windshield and a vehicle occupant. An inflation fluid source is actuatable to provide inflation fluid for inflating the windshield curtain. The windshield curtain includes overlying panels interconnected to define an inflatable volume of the windshield curtain. The windshield curtain includes a pleated portion wherein at least one of the panels has portions folded over to form at least one pleat in the panel. The windshield curtain includes connections that interconnect overlying folded portions of the one panel along the pleat. Portions of the pleat between the connections are unfoldable to allow expansion of the pleated portion upon inflation of the windshield curtain.

The present invention also relates to an inflatable vehicle occupant protection device comprising a first panel of a material having a predetermined pattern (i.e., size and shape) and a second panel of material having a pleated condition in which portions of the second panel are folded over to form pleats. The second panel, when folded in the pleated condition, has a pattern about the same as the predetermined pattern of the first panel. The protection device also includes means for interconnecting the first and second panels along a perimeter of the panels to define an inflatable volume of the protection device. The interconnecting means also interconnects overlying ones of the folded over portions of the second panel that form the pleats.

The present invention also relates to an apparatus including an inflatable vehicle occupant protection device inflatable between a part of a vehicle and a vehicle occupant. The apparatus also includes an inflation fluid source actuatable to provide inflation fluid for inflating the inflatable vehicle occupant protection device. The inflatable vehicle occupant protection device includes overlying panels interconnected to help define an inflatable volume of the inflatable vehicle occupant protection device. At least one of the overlying panels includes at least one pleat comprising folded over portions of the one panel. The folded over portions are interconnected at opposite ends of the pleat.

The present invention further relates to a method for constructing an inflatable vehicle occupant protection device. The method includes the steps of providing a first panel of a material having a predetermined pattern and providing a second panel of material having a predetermined pattern larger than the first panel. The method also includes the step of folding pleats in the second panel such that the pattern of the second panel is about the same as the pattern of the first panel. The method also includes the step of placing the folded second panel in an overlying relationship with the first panel and interconnecting the panels along their perimeters to define an inflatable volume of the inflatable vehicle occupant protection device. The method includes the further step of interconnecting overlying portions of the second panel folded over to form the pleats.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

Figure 4:
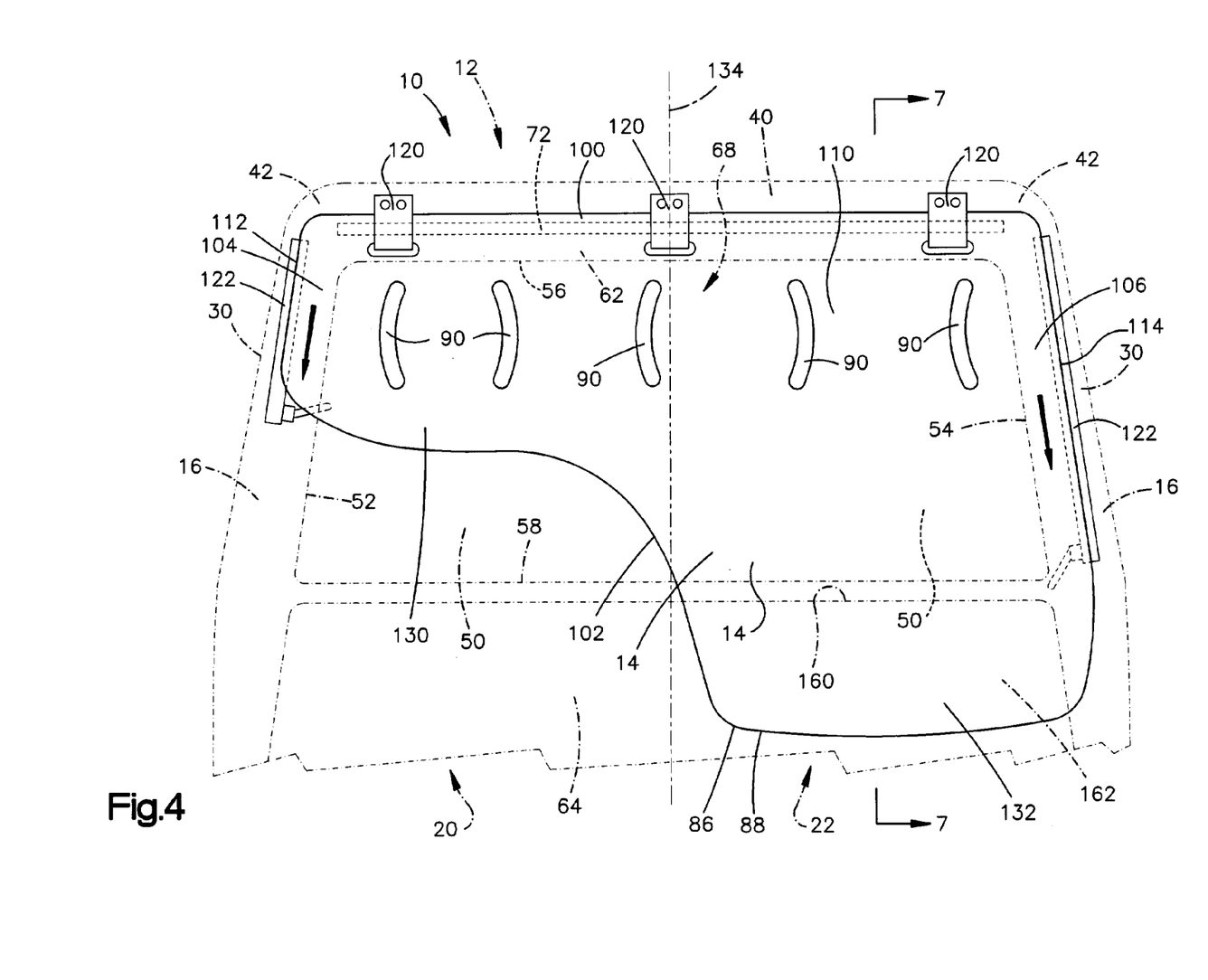
FIG. 4 is a schematic front view of a portion of the apparatus of FIGS. 2 and 3.
Figure 5:
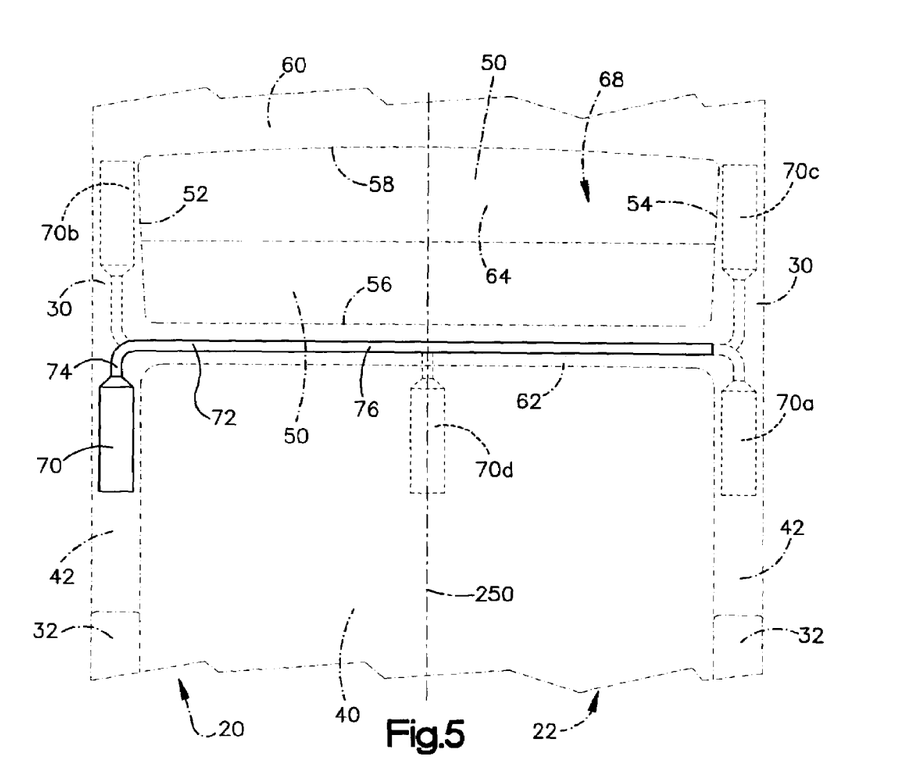
FIG. 5 is a schematic top view of the apparatus of FIGS. 1–3 with certain parts omitted for clarity.

In this description of embodiments of the present invention, when reference is made to a longitudinal direction in or along the vehicle 12, it is meant to describe the direction measured generally along a central axis 250 (see FIG. 5) of the vehicle. This longitudinal direction may also be described as the direction measured generally along the length of the vehicle, in the direction of straight forward vehicle travel, or horizontally as viewed in FIGS. 1–3. Also, in this description of the present invention, when reference is made to a lateral direction in or across the vehicle 12, it is meant to describe the direction measured generally perpendicular to the central axis 250 (FIG. 5). This lateral direction may also be described as the direction measured generally along the width of the vehicle, perpendicular to the direction of straight forward vehicle travel, or horizontally as viewed in FIGS. 4 and 5.

Figure 1:
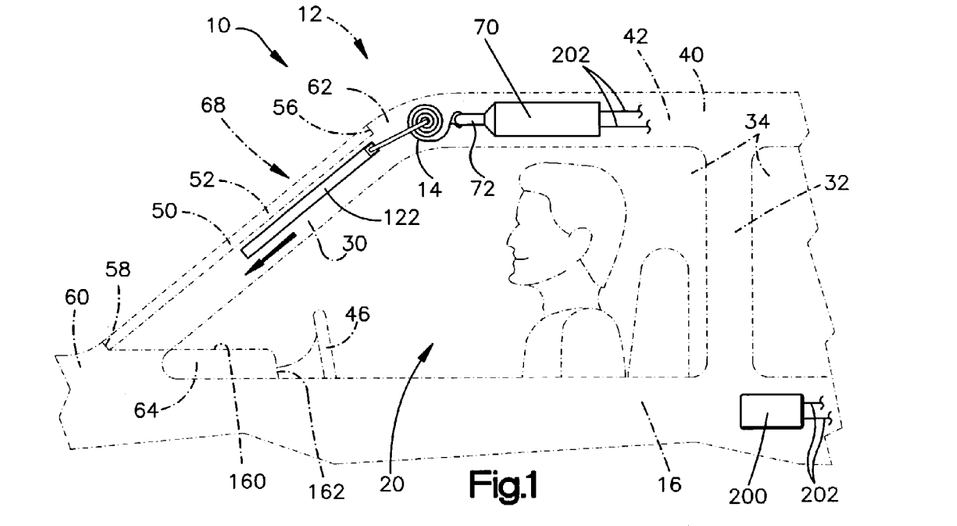
FIG. 1 is a schematic side view of an apparatus for helping to protect a vehicle occupant illustrating the apparatus in a deflated and stored condition, according to a first embodiment of the present invention.
Figure 2:
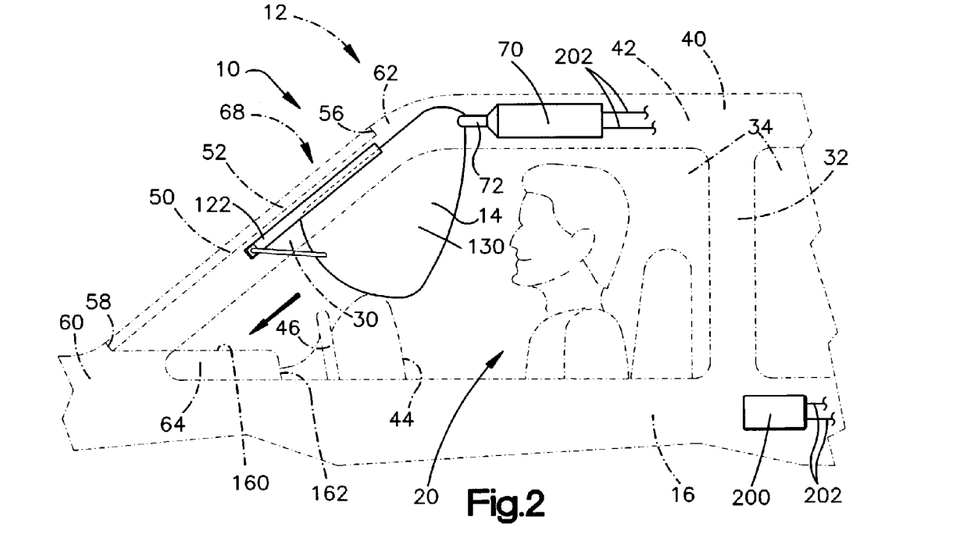
FIGS. 2 and 3 are schematic side views of the apparatus of FIG. 1 in an inflated and deployed condition.
Figure 3:
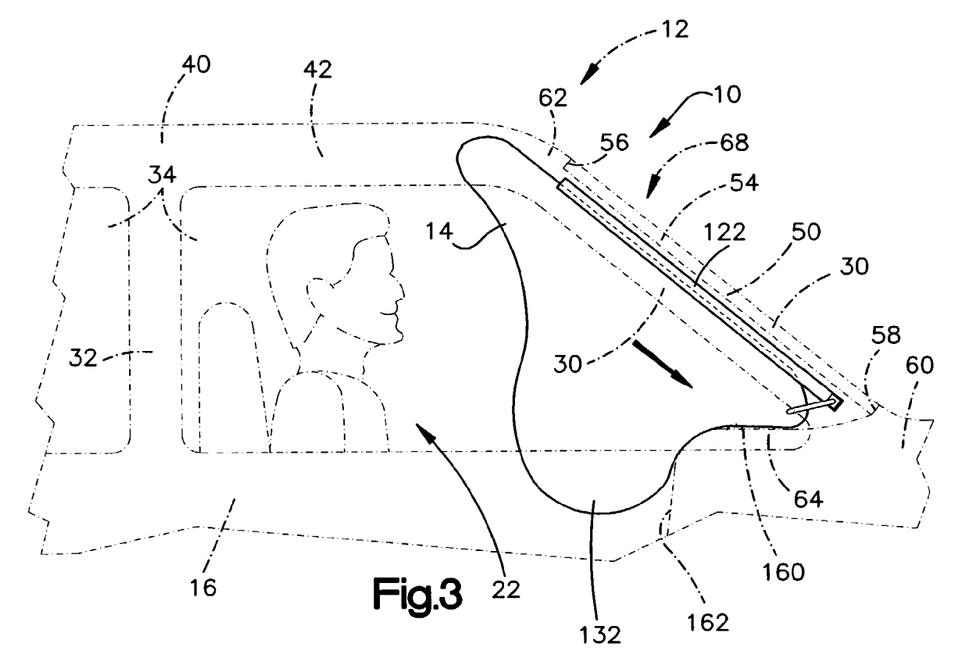

Referring to FIGS. 1–3, as representative of a first embodiment of the present invention, an apparatus 10 helps to protect an occupant of a vehicle 12. The vehicle 12 includes side structure 16 that extends longitudinally along the length of the vehicle. Referring to FIGS. 4 and 5, it will be appreciated that the vehicle 12 includes a side structure 16 that extends along a driver side 20 of the vehicle and a side structure that extends along a passenger side 22 of the vehicle 12. Each of the side structures 16 on the driver side 20 and passenger side 22 includes an A pillar 30, a B pillar 32 (see FIGS. 1–3), and side windows 34.

Referring to FIGS. 1–5, the vehicle 12 also includes a roof 40 that extends laterally across the vehicle 12 from the side structure 16 on the driver side 20 to the side structure on the passenger side 22 of the vehicle. The roof 40 also extends longitudinally along the length of the vehicle 12 from the A pillar 30 past the B pillar 32. The roof 40 includes roof rails 42 that extend along the intersection of the side structure 16 and the roof on the driver side 20 and passenger side 22 of the vehicle 12.

As shown in FIG. 2, in the first embodiment, the vehicle 12 includes a driver side front impact air bag 44 mounted to a steering wheel 46 of the vehicle on the driver side 20 of the vehicle. The front impact air bag 44 is illustrated in FIG. 2 in an inflated and deployed condition.

Referring to FIGS. 1–5, the vehicle 12 further includes a windshield 50. The windshield 50 extends laterally across the vehicle 12 from the A pillar 30 on the driver side 20 to the A pillar on the passenger side 22. The windshield 50 covers a windshield opening 68 of the vehicle 12. The windshield opening 68 is defined at an upper extent by the forward edge 62 of the vehicle roof 40 and at a lower extent generally by the instrument panel 64 and/or hood 60 of the vehicle 12. The windshield opening 68 is defined at lateral extents by the A pillars 30 on the driver side 20 and passenger side 22 of the vehicle 12.

The windshield 50 has a first edge portion 52 that extends along the A pillar 30 on the driver side 20 from a position adjacent or near the intersection of the A pillar and the vehicle roof 40 to a position adjacent or near the intersection of the A pillar and the instrument panel 64 and/or hood 60 of the vehicle 12. The windshield 50 also has a second edge portion 54 opposite the first edge portion 52. The second edge portion 54 extends along the A pillar 30 on the passenger side 22 from a position adjacent or near the intersection of the A pillar and the vehicle roof 40 to a position adjacent or near the intersection of the A pillar and the instrument panel 64 and/or hood 60 of the vehicle 12.

The windshield 50 extends from the roof 40 to a position adjacent or near the instrument panel 64 and/or hood 60 of the vehicle 12. The windshield 50 has an upper edge 56 and an opposite lower edge 58 that extend laterally in the vehicle 12 between the first and second edge portions 52 and 54. The upper edge 56 extends laterally across the vehicle 12 along the forward edge 62 of the vehicle roof 40 from the A pillar on the driver side 20 to the A pillar on the passenger side 22. The lower edge 58 extends laterally across the vehicle 12 from the A pillar on the driver side 20 to the A pillar on the passenger side 22. The lower edge 58 extends adjacent or near the instrument panel 64 and/or hood 60 of the vehicle 12.

The apparatus 10 includes an inflatable vehicle occupant protection device in the form of an inflatable windshield curtain 14 that is mounted adjacent the forward edge 62 of the vehicle roof 40. An inflator 70 is connected in fluid communication with the windshield curtain 14 through a fill tube 72. The inflator 70 is actuatable to provide inflation fluid for inflating the windshield curtain 14.

The fill tube 72 has a first portion 74 (FIG. 5) for receiving fluid from the inflator 70. The fill tube 72 has a second portion 76 disposed in the windshield curtain 14. The second portion 76 of the fill tube 72 has a plurality of openings (not shown) that provide fluid communication between the fill tube 72 and the windshield curtain 14. Those skilled in the art will appreciate that the fill tube 72 could, however, be omitted, in which case the inflator 70 may be connected in fluid communication with the windshield curtain 14 directly or via a manifold (not shown).

The inflator 70 contains a stored quantity of pressurized inflation fluid (not shown) in the form of a gas for inflating the windshield curtain 14. The inflator 70 alternatively could contain a combination of pressurized inflation fluid and ignitable material for heating the inflation fluid, or could be a pyrotechnic inflator that uses the combustion of gas-generating material to generate inflation fluid. As a further alternative, the inflator 70 could be of any suitable type or construction for supplying a medium for inflating the windshield curtain 14.

In the embodiment of FIGS. 1–7, the inflator 70 is positioned adjacent the roof rail 42 on the driver side 20 of the vehicle 12. The fill tube 72 thus extends from the inflator 70 along a portion of the roof rail 42 and into the windshield curtain 14 along the intersection of the forward edge 62 of the vehicle roof and the upper edge 56 of the windshield 50. It will be appreciated, however, that the inflator 70 may have alternative positions in the vehicle 12.

By way of example, referring to FIG. 5, the inflator 70 may be positioned adjacent the roof rail 42 on the passenger side 22 of the vehicle 12. This is illustrated at 70*a*. As another example, the inflator could be positioned in or on the A pillar 30 on the driver side 20 or passenger side 22 of the vehicle 12, as indicated at 70*b* and 70*c*, respectively, in FIG. 5. As a further example, the inflator could be positioned centrally on the roof 40, as indicated at 70*d*, in which case the inflator may have a T-shaped connection with the fill tube 72. This central location may also be advantageous in a configuration of the apparatus in which the fill tube 72 is omitted and the inflator 70 is connected to the windshield curtain 14 directly or via a manifold. Yet another example (not shown) is to position the inflator 70 within the instrument panel 64 of the vehicle 12.

Figure 6:
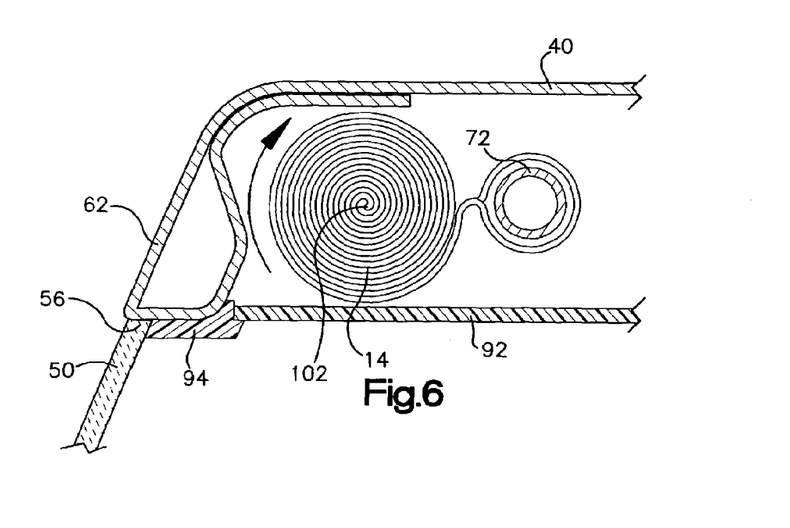
FIG. 6 is a sectional view of the apparatus in the deflated and stored condition of FIG. 1.

The apparatus 10 has a stored condition in which the windshield curtain 14 is stored in a deflated condition. This is illustrated in FIGS. 1 and 6. When the apparatus 10 is in the stored condition, the deflated windshield curtain 14 has an elongated configuration and extends along the forward edge 62 of the vehicle roof 40 adjacent or near the upper edge 56 of the windshield 50. In the stored condition, the windshield curtain 14 extends from the A pillar 30 on the driver side 20 of the vehicle 12 to the A pillar on the passenger side 22 of the vehicle.

Referring to FIG. 6, the windshield curtain 14 is placed in the deflated and stored condition by rolling the curtain in a direction indicated by the curved arrow in FIG. 6. This is referred to herein as an "outboard roll" of the windshield curtain 14. According to this outboard roll, the windshield curtain 14 is placed in the stored condition of FIG. 6 by initially rolling the lower edge 102 of the curtain in a direction outboard of the vehicle 12 toward the windshield 50 and continuing to roll the curtain in this direction. Alternative methods, however, may be used to place the windshield curtain 14 in the stored position. For example, the windshield curtain 14 may be folded in a back-and-forth manner sometimes referred to as a "fan fold" or "Z fold." As another example, the windshield curtain 14 may be folded over and then rolled into the stored position.

When the windshield curtain 14 is in the deflated and stored condition, the curtain is positioned between the vehicle roof 40 and a headliner 92 of the vehicle 12. The headliner 92 may be partially supported or covered by a vehicle trim piece 94. The trim piece 94 may, for example, extend along the intersection of the vehicle roof 40 and the windshield 50. The apparatus 10 may also include a housing (not shown) that houses the windshield curtain 14 in the stored condition between the roof 40 and the headliner 92.

Figure 7:
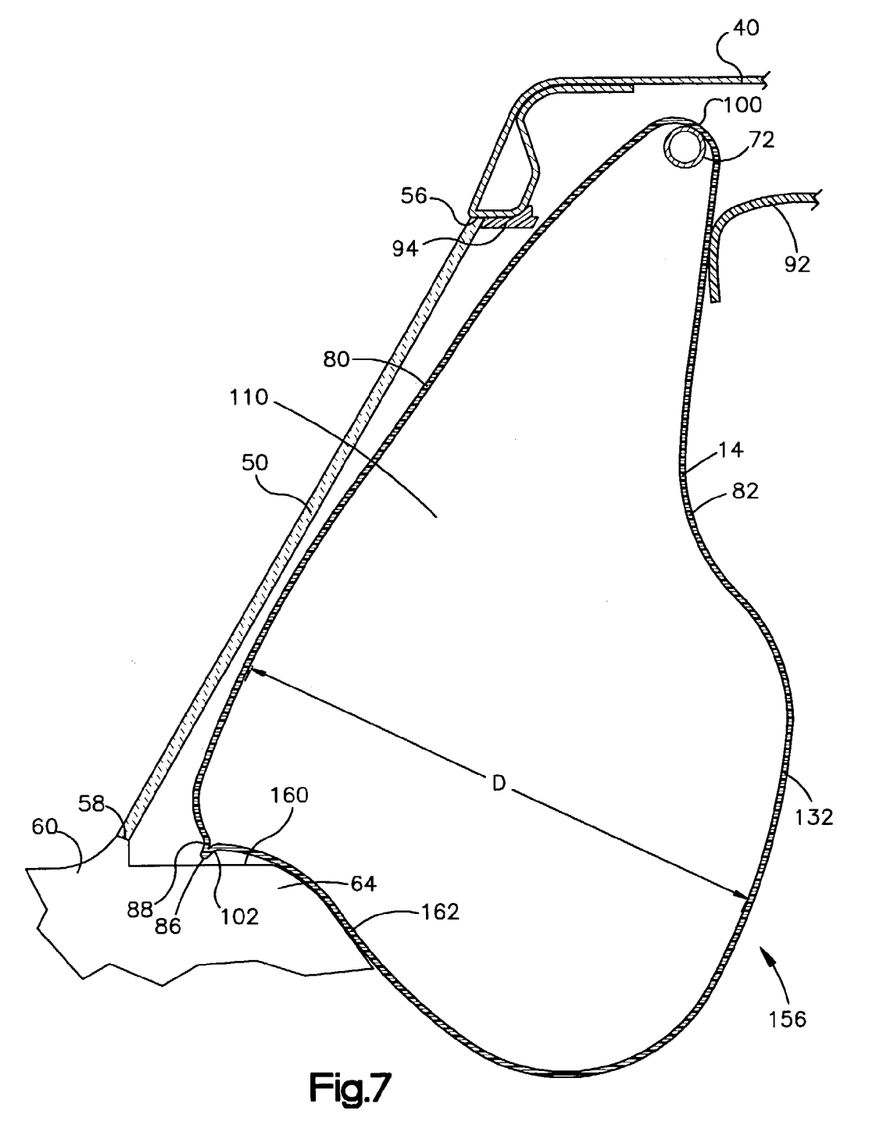
FIG. 7 is a sectional view of the apparatus taken generally along line 7—7 in FIG. 4.

Referring to FIG. 7, the windshield curtain 14 comprises first and second panels 80 and 82 that are arranged in an overlying manner. As shown in the illustrated embodiment, the first and second panels 80 and 82 may be interconnected to form a perimeter connection 86 (FIGS. 4 and 7) that extends along a perimeter 88 of the panels. The first and second panels 80 and 82 may also be interconnected to form connections 90 within the perimeter 88 of the windshield curtain 14. The perimeter connection 86 and the connections 90 may help define inflatable chambers of the windshield curtain 14.

The first and second panels 80 and 82 may be interconnected in a variety of manners. For example, in a woven construction, the windshield curtain 14 may be formed by weaving the first and second panels 80 and 82 simultaneously and interweaving the panels to form the perimeter connection 86 and the connections 90 as single layers of fabric. This can be accomplished by using, for example, a Jacquard or Dobby weaving machine.

Alternatively, means such as stitching, dielectric sealing, ultrasonic bonding, heat sealing, and adhesives may be used to interconnect the first and second panels 80 and 82 in order to form the perimeter connection 86 and the connections 90. In these alternative constructions, the windshield curtain 14 may be formed by interconnecting two separate fabric pieces together along the perimeter connection 86 and the connections 90. As a further alternative, a single piece of fabric may be folded over to form the overlying first and second panels 80 and 82. In this alternative, the fold would form part of the perimeter connection 86 of the windshield curtain 14.

The windshield curtain 14 may have a variety of material constructions. For example, the windshield curtain 14 may be constructed of a woven fabric, such as nylon, that is coated with a gas impermeable material, such as urethane or silicone. The windshield curtain 14 thus may have a substantially gas-tight construction. Other materials, such as elastomers, plastic films, or combinations thereof, may also be used to construct the windshield curtain 14, in which case the curtain may have a non-woven construction. The materials used to construct the windshield curtain 14 may also be single or multi-layered materials.

The first and second panels 80 and 82, the perimeter connection 86, and the connections 90 may be coated using a laminate film, slurry, and/or a spray coating, such as silicone, urethane, or other suitable material, in order to achieve a substantially gas-tight construction. This helps to prevent gas from permeating directly through the first and second panels 80 and 82, or through the perimeter connection 86 or connections 90.

The perimeter 88 (FIG. 4) of the windshield curtain 14 is defined by upper and lower edges 100 and 102, respectively, of the curtain and first and second end portions 104 and 106, respectively, of the curtain that are spaced apart horizontally along the upper and lower edges. The perimeter connection 86 and the connections 90 help define an inflatable volume 110 of the windshield curtain 14. The first end portion 104 includes a first edge 112 of the windshield curtain 14 that extends between the upper edge 100 and the lower edge 102 of the curtain. The second end portion 106 includes a second edge 114 of the windshield curtain 14 that extends between the upper edge 100 and the lower edge 102 of the curtain.

The inflatable volume 110 of the windshield curtain 14 may have a variety of configurations defined by the shape of the perimeter connection 86 and the arrangement of the connections 90 within the perimeter connection. One such configuration is illustrated in the first embodiment of FIGS. 1–7. Those skilled in the art, however, will appreciate that the configuration of the inflatable volume 110 could vary without departing from the spirit of the present invention.

The windshield curtain 14 is adapted to receive one or more fastening devices 120 (FIG. 4), such as clamps or brackets, for helping to connect the windshield curtain to the vehicle 12. In the illustrated embodiment, the apparatus 10 includes three fastening devices 120 for connecting the windshield curtain 14 and the fill tube 72 to the vehicle roof 40.

Referring to FIGS. 1–7, the apparatus 10 also includes a pair of slider mechanisms 122 for helping to guide and position the windshield curtain 14 in the vehicle 12 upon inflation and deployment of the curtain. A slider mechanism 122 is provided on the A pillar 30 on both the driver side 20 and passenger side 22 of the vehicle 12. The first and second edges 112 and 114 of the windshield curtain 14 are connected to the slider mechanisms 122 on their respective A pillars 30. As shown in FIGS. 1 and 4, the slider mechanism 122 on the A pillar 30 of the driver side 20 has a shortened length to correspond with the length of the first edge 112.

Those skilled in the art will appreciate that alternative means may be provided for helping to guide and position the windshield curtain 14 in the vehicle 12. For example, tethers (elastic or inelastic), piston/cylinder devices, devices actuatable to cause rotation of a member such as a spool to wind up a flexible member, or any other suitable device, could help guide and position the windshield curtain 14 in the vehicle 12. Also, it will be appreciated that the slider mechanisms 122 could be eliminated and the windshield curtain 14 could be connected directly to the A pillars 30 by suitable means, such as fasteners.

Referring to FIG. 4, the windshield curtain 14 has a driver side portion 130 and a passenger side portion 132. The driver side portion 130 extends across the windshield 50 on the driver side 20 of the vehicle 12 from the driver side A pillar 30 to a vehicle centerline 134. The passenger side portion 132 extends across the windshield 50 on the passenger side 22 of the vehicle 12 from the passenger side A pillar 30 to the vehicle centerline 134.

Figure 8:
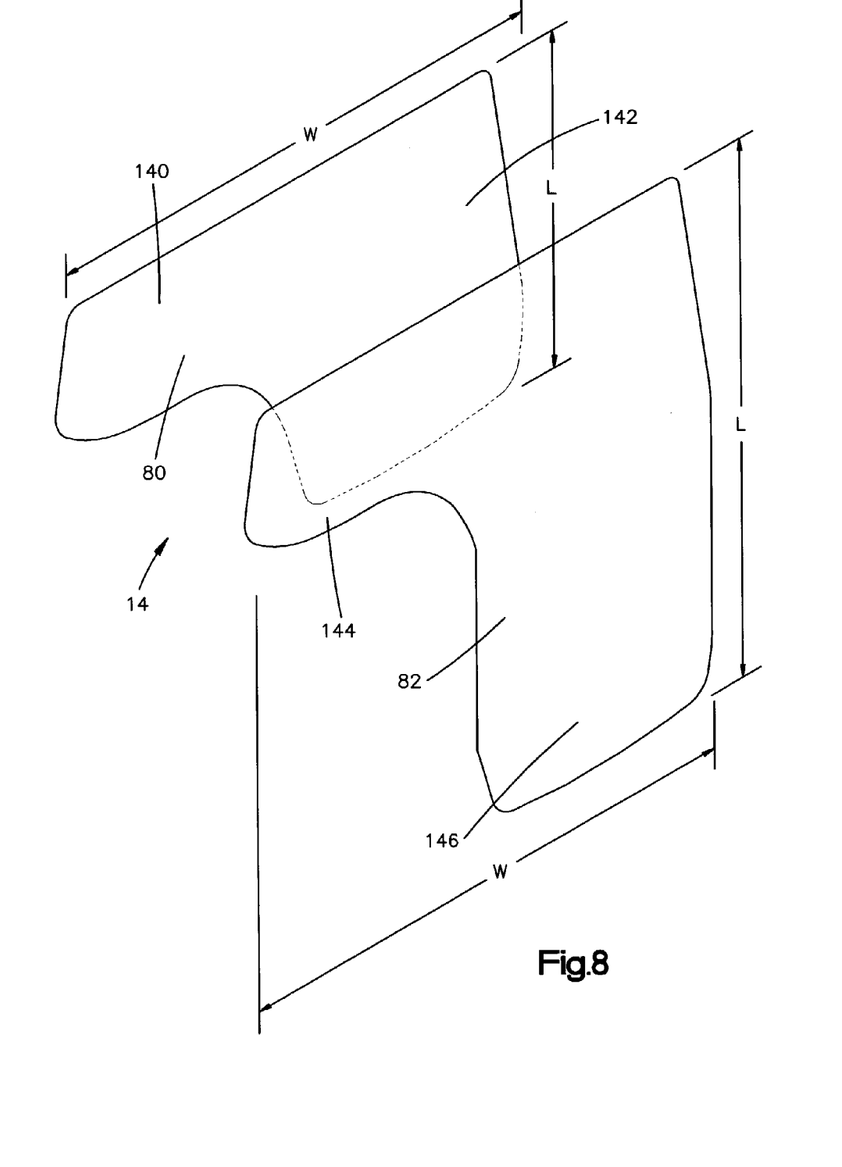
FIG. 8 is a schematic perspective view illustrating component parts of a portion of the apparatus.

Referring to FIG. 8, the first and second panels 80 and 82 are illustrated schematically in a condition prior to being interconnected to form the windshield curtain 14. As shown in FIG. 8, the windshield curtain 14 and each of the panels 80 and 82 has a width identified at "W" and a length identified at "L." The width W of the windshield curtain 14 extends laterally across the vehicle 12 when the curtain is installed in the vehicle (see FIG. 4). The length L of the windshield curtain 14 extends perpendicular to the width W of the curtain. When the windshield curtain 14 is installed in the vehicle 12, length L of the curtain extends along the windshield 50.

As shown in FIG. 8, the first panel 80 has a driver side portion 140 and a passenger side portion 142. The second panel 82 has a driver side portion 144 and a passenger side portion 146. When the first and second panels 80 and 82 are interconnected, the driver side portions 140 and 144 combine to help define the driver side portion 130 of the windshield curtain 14 and the passenger side portions 142 and 146 combine to help define the passenger side portion 132 of the windshield curtain 14.

According to the present invention, at least one of the first and second panels 80 and 82 of the windshield curtain 14 has a pleated construction. The pleats are provided in an area or region of the windshield curtain 14 where it is desired to provide an increase in the inflated depth of the curtain, as described in further detail below. In the embodiment illustrated in FIGS. 1–8, this region of increased inflated depth lies in the passenger side portion 132 of the windshield curtain 14.

In the embodiment shown in FIG. 8, the passenger side portion 146 of the second panel 82 has a length L that is greater than the length L of the passenger side portion 142 of the first panel 80. The passenger side portion 146 of the second panel 82 is folded or otherwise arranged to form pleats. This is shown in FIGS. 9A and 9B.

Figure 9A:
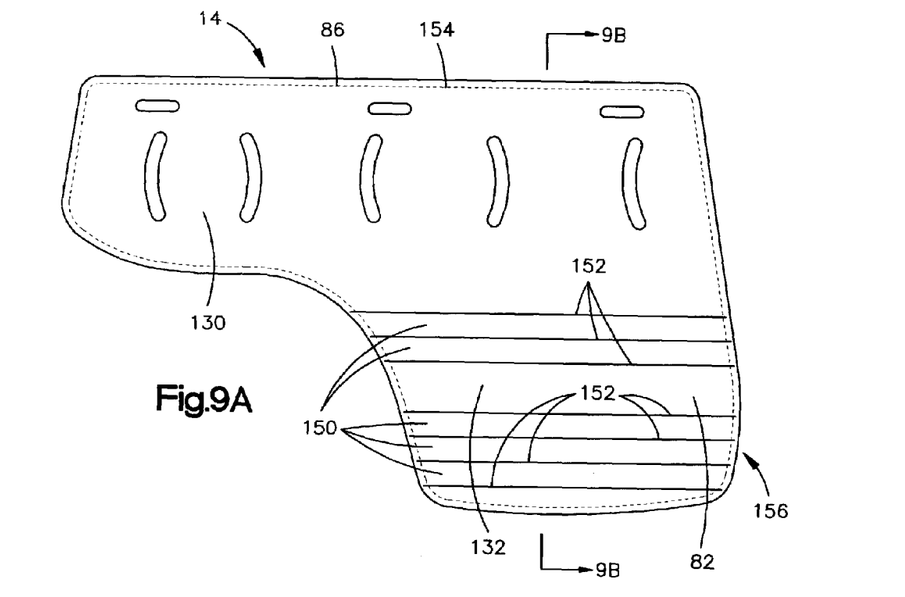
FIG. 9A is a schematic front view of the portion of the apparatus of FIG. 8 in an assembled condition.
Figure 9B:
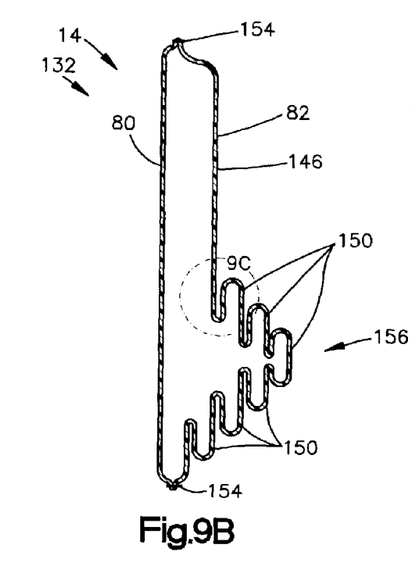
FIG. 9B is a sectional view taken generally along line 9B—9B in FIG. 9A.

Referring to FIGS. 9A and 9B, pleats 150 are formed in the passenger side portion 146 of the second panel 82 by folding the second panel along fold lines 152. More specifically, the pleats 150 are formed in a region of the passenger side portion 132 of the windshield curtain 14 identified at 156 in FIGS. 9A and 9B. In the embodiment illustrated in FIGS. 9A and 9B, the region 156 comprises a lower region of the passenger side portion 132 of the windshield curtain 14.

Figure 9C:
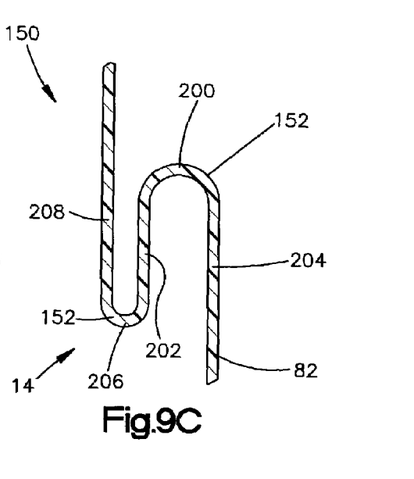
FIG. 9C is a magnified view of a portion of the apparatus of FIG. 9B.

In this description, a "pleat" is meant to describe a portion of the windshield curtain 14 in which a curtain panel is folded over or doubled onto itself. This is detailed in FIG. 9C. Referring to FIG. 9C, the pleat 150 includes three overlying portions of the second panel 82. The panel 82 is folded along a first fold line 200 to form a first portion 202 that overlies a second portion 204. The panel 82 is also folded along a second fold line 206 to form a third portion 208 that overlies the first portion 202 opposite the second portion 204. Referring to FIGS. 9A and 9C, stitching 154 connects the portions 202, 204, and 208 of the pleats 150 at opposite ends of the pleat.

In the embodiment illustrated in FIGS. 9A–9C, the windshield curtain 14 is formed from separate, overlying first and second panels 80 and 82. Referring to FIG. 8, each of the first and second panels 80 and 82 has a predetermined pattern, i.e., size and shape. The pattern of the passenger side portion 146 of the second panel 82 is selected so that the second panel and the first panel 80 have similar or identical patterns after the pleats have been formed in the second panel. More specifically, the passenger side portion 146 of the second panel 82 has a length L that is greater than the length L of the passenger side portion 142 of the first panel 80. The pleats 150 are folded perpendicular to the length L. The pleats 150 thus reduce the length L of the passenger side portion 146 to be about the same as the length L of the unfolded passenger side portion 142.

Once the pleats 150 are formed, the first and second panels 80 and 82 are positioned overlying each other and are stitched together. The stitching 154 interconnects the first and second panels 80 and 82 and also extends through the pleats 150 to interconnect the overlying pleated portions of the second panel.

The stitching 154 illustrated in FIGS. 9A and 9B forms the perimeter connection 86 and also secures and maintains the pleats 150 in the second panel 82. It will be appreciated, however, that the stitching used to secure the pleats 150 may be separate from the stitching used to form the perimeter connection 86. It will be further appreciated that, in the alternative constructions of the windshield curtain 14 discussed above, e.g., a woven construction or a folded-over panel construction, separate stitching may be used to maintain the pleats 150. In fact, the pleats 150 may be maintained by any suitable means, such as an adhesive.

In FIG. 9B, the first and second panels 80 and 82 are shown spaced from each other. Also, the folded portions of the passenger side portion 146 of the second panel 82 are shown spaced from each other. This is for the purpose of providing clarity in FIG. 9B. It should be recognized that the panels 80 and 82 and the pleats 150 may be pressed flat against each other so that the windshield curtain may be folded and/or rolled into the stored condition (see FIGS. 1 and 6).

The vehicle 12 includes a sensor mechanism 200 (shown schematically in FIGS. 1 and 2) for sensing an event for which inflation of the windshield curtain 14 is desired, such as a vehicle collision and/or a vehicle rollover. Upon sensing the occurrence of the event for which inflation of the windshield curtain 14 is desired, the sensor mechanism 200 provides an electrical signal over lead wires 202 to the inflator 70. The electrical signal causes the inflator 70 to be actuated in a known manner. The inflator 70 discharges fluid under pressure into the fill tube 72. The fill tube 72 directs the fluid into the inflatable volume 110 of the windshield curtain 14.

The windshield curtain 14 inflates under the pressure of the inflation fluid from the inflator 70. The windshield curtain 14 inflates and deploys away from the roof 40 and along the windshield 50 in a generally downward and forward direction as indicated generally by the arrows in FIGS. 1–4 into the position illustrated in FIGS. 2–4 and 7.

Referring to FIGS. 2–4, the windshield curtain 14 when inflated, extends laterally across the vehicle from the A pillar 30 on the driver side 20 to the A pillar on the passenger side 22. The first edge 112 may overlie the A pillar 30 on the driver side 20 of the vehicle 12. The second edge 114 may overlie the A pillar 30 on the passenger side 22 of the vehicle 12. The upper edge 100 is positioned adjacent the forward edge 62 of the roof 40 and the upper edge 56 of the windshield 50.

Referring to FIGS. 2 and 4, when the windshield curtain 14 is in the inflated position, the driver side portion 130 extends laterally in the vehicle 12 from the A pillar 30 on the driver side 20 to about the center line 134 of the vehicle. The driver side portion 130 extends vertically in the vehicle 12 from the vehicle roof 40 to a position spaced above the instrument panel 64, in the area of an upper extent of the steering wheel 46 and driver side air bag 44.

Referring to FIGS. 3 and 4, when the windshield curtain 14 is in the inflated position, the passenger side portion 132 extends laterally in the vehicle 12 from the A pillar 30 on the passenger side 22 to about the center line 134 of the vehicle. The passenger side portion 132 extends vertically in the vehicle 12 from the vehicle roof 40 to a position adjacent the instrument panel 64. The passenger side portion 132 extends below an upper surface 160 of the instrument panel 64 and adjacent a front surface 162 of the instrument panel.

In FIGS. 3 and 4, the instrument panel 64 has a distinct upper surface 160 that extends generally horizontally in the vehicle 12 and a distinct front surface 162 that extends generally vertically in the vehicle and intersects the upper surface. Those skilled in the art, however, will appreciate that the instrument panel 64 may have a variety of alternative constructions in which the upper surface 160 and front surface 162 are not as distinct and/or do not extend in the respective horizontal and vertical directions in the vehicle 12. The instrument panel 64 could, for example, have a curved or contoured configuration free from distinct upper and front surfaces.

This being the case, it will be appreciated that the passenger side portion 132 of the windshield curtain 14, when inflated, extends along the windshield 50 from the roof 40 to the instrument panel 64, and then extends along the contour of the instrument panel 64. The passenger side portion 132 may thus be positioned between the instrument panel 64 and an occupant in the passenger side 22 of the vehicle 12. The configuration or arrangement of the pleats 150 of the passenger side portion 132 of the windshield curtain 14 may be adjusted or altered in response to varying configurations or contours of the instrument panel 64 so that the curtain follows the contour of the panel.

When the windshield curtain 14 is in the inflated condition, the driver side portion 130 (FIGS. 2 and 4) extends from the vehicle roof 40 to a position adjacent the upper portion of the steering wheel 46. The driver side portion 130, when in the inflated condition, also extends adjacent the driver side air bag 44. As shown in FIG. 2, the driver side portion 130, when in the inflated condition, may touch the driver side air bag.

The driver side portion 130, when inflated, is positioned between a vehicle occupant and the windshield 50 and windshield opening 68. The driver side air bag 44, when inflated, is positioned between the steering wheel 46 and the vehicle occupant. The driver side portion 130 and driver side air bag 44, when inflated, combine to form an inflated wall that provides vehicle occupant protection from the vehicle roof 40 down to and covering the steering wheel 46.

When the windshield curtain 14 is in the inflated condition, the passenger side portion 132 (see FIGS. 3 and 4) extends from the vehicle roof 40 to a position adjacent the front surface 162 and below the upper surface 160 of the instrument panel 64. The passenger side portion 132, when inflated, is thus positioned between a vehicle occupant and the windshield 50 and windshield opening 68 as well as the instrument panel 64. The passenger side portion 132 provides an inflated area of protection that extends on the passenger side 22 of the vehicle 12 from the vehicle roof 40 down to adjacent the front surface 162 and below the upper surface 160 of the instrument panel 64.

When the windshield curtain 14 inflates to the inflated condition, the pleats 150 unfold to allow for the expansion of the passenger side portion 132 of the curtain. The stitching 154 maintains the interconnection of the overlying portions (see 202, 204, and 208 in FIG. 9C) of the panel 82 at opposite end portions of the pleats 150. The portions of the pleats 150 positioned between these opposite end portions unfold while the end portions remain in the connected and folded condition described above.

The degree to which the windshield curtain 14 expands in the area of the pleats 150 may be determined by adjusting the number of pleats, the width of the pleats, the length of the pleats, and the location at which the folded over portions of the pleats are interconnected. Adjusting the number and/or width of the pleats 150 helps determine the amount of the panel (e.g., length) that is folded up into the pleats and thereby helps determine the inflated depth (as defined below) of the pleated portion. Adjusting the width of the pleats 150 and the locations at which the folded over portions of the pleats are interconnected helps define the bounds or extent of the pleated portion of the curtain 14. The bounds or extent of the pleated portion of the windshield curtain 14 may be measured or defined in terms of a height and width of the pleated portion. The height of the pleated portion may be measured vertically as viewed in FIG. 3, and the width of the pleated portion may be measured horizontally as viewed in FIG. 4.

The pleats 150, when unfolded, allow the passenger side portion 132 of the windshield curtain 14 to inflate to an increased depth in comparison with other portions of the curtain. The depth of the windshield curtain 14 is measured in the direction of the dimension labeled "D" in FIG. 7. As best shown in FIG. 7, the region 156 of the passenger side portion 132 inflates to an increased depth as compared to other portions of the windshield curtain 14.

The increased depth of the passenger side portion 132 allows the windshield curtain 14, while inflated, to extend from adjacent the windshield 50, along the upper surface 160, and adjacent the front surface 162 of the instrument panel 64. This allows the windshield curtain to be positioned between an occupant of the passenger side 22 of the vehicle 12 and the windshield 50 and also between the occupant and the instrument panel 64. Because of the increased depth of the passenger side 132 of the windshield curtain 14, the windshield 50 and the instrument panel 64 may form a reaction surface for helping to support the curtain.

In the first embodiment of the present invention, the pleats 150 are formed in the second panel 82 of the windshield curtain 14. This is because the apparatus 10 of the first embodiment includes slider mechanisms 122 for guiding and positioning the windshield curtain 14 to the inflated position. The slider mechanisms 122 guide and support the first panel 80 to a position extending along the windshield 50 when the curtain 14 is inflated (see FIG. 7). This being the case, the pleats 150 are provided in the second panel 82 to provide for expansion away from the windshield 50 to increase the depth D of the windshield curtain 14.

In the embodiment illustrated in FIGS. 9A and 9B, the pleats 150 have been illustrated as being formed in the second panel 82. Those skilled in the art, however, will appreciate that the pleats 150 may be formed in the first panel 80, in the second panel 82, or in both the first and second panels. For example, in an embodiment where the slider mechanisms 122 are omitted, the pleats 150 may be formed in the first panel 80, in the second panel 82, or in both the first and second panels. In this instance, the pleats 150 in the first panel 80 and/or the second panel 82 would expand to increase the depth of the windshield curtain 14 in order to fill the desired space.

The windshield curtain 14, when inflated, helps to protect a vehicle occupant upon the occurrence of an event (e.g., vehicle collision or rollover) for which inflation of the windshield curtain is desired. The connections 90 help to limit the thickness of the inflated windshield curtain 14 and help to reduce the overall volume of the curtain. The pleats 150 allow the windshield curtain 14 to have an expanded depth in desired areas. The inflated chambers of the windshield curtain 14, while inflated, help to absorb the energy of impacts with the windshield curtain and help to distribute the impact energy over a large area of the curtain.

Alternative embodiments of the present invention are illustrated in FIGS. 10A–10D. The alternative embodiments of the invention are similar to the first embodiment of the invention illustrated in FIGS. 1–9B. Accordingly, numerals similar to those of FIGS. 1–9B will be utilized in FIGS. 10A–10D. The suffix letter "a" will be associated with the numerals of FIG. 10A to avoid confusion. The suffix letter "b" will be associated with the numerals of FIG. 10B to avoid confusion. The suffix letter "c" will be associated with the numerals of FIG. 10C to avoid confusion. The suffix letter "d" will be associated with the numerals of FIG. 10D to avoid confusion.

Figure 10A:
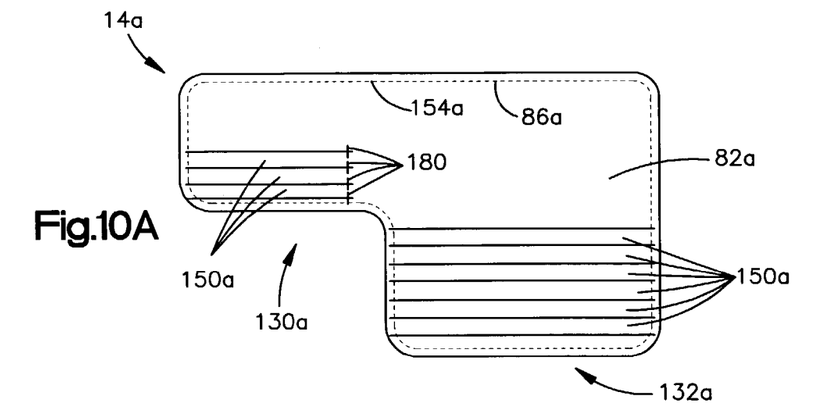
FIG. 10A is a schematic front view of an apparatus for helping to protect a vehicle occupant, according to a second embodiment of the present invention.

FIG. 10A illustrates a windshield curtain 14a in accordance with a second embodiment of the present invention. The windshield curtain 14a of the second embodiment is similar to the first embodiment (FIGS. 1–9B), except that the windshield curtain of the second embodiment (FIG. 10A) includes pleats 150a on the driver side 130a and the passenger side 132a of the curtain.

The pleats 150a on the driver side 130a of the windshield curtain 14a may provide an increased depth so that the curtain may better occupy or fill space on the driver side of the vehicle. For example, the increased depth may better occupy or fill space between the steering wheel and the windshield or space between the steering wheel and an occupant of the vehicle. Because the pleats 150a better occupy or fill these spaces, the windshield curtain 14a may provide an improved reaction surface for absorbing impacts with the curtain. The pleats 150a may also allow the curtain 14a to provide coverage over a desired area of the vehicle.

The pleats 150a may be formed on the first panel (not shown), on the second panel 82a, or on both the first and second panels. Stitching 154a maintains the pleats 150a. It should be noted that, in the embodiment of FIG. 10A, additional stitching, identified at 180, maintains ends of the pleats 150a that are spaced away the perimeter connection 86a.

Figure 10B:
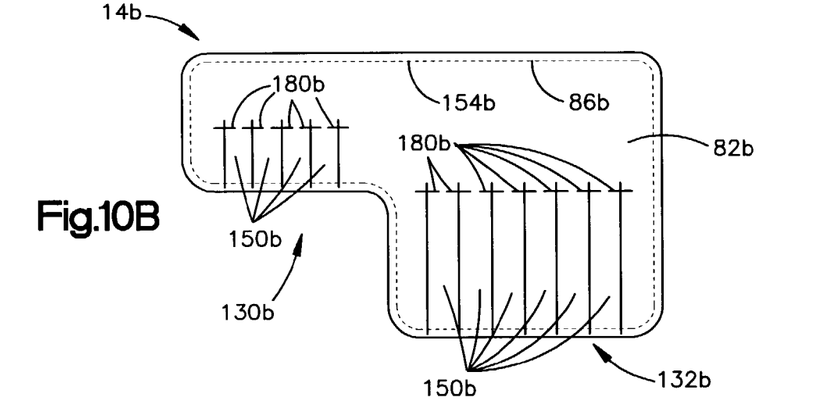
FIG. 10B is a schematic front view of an apparatus for helping to protect a vehicle occupant, according to a third embodiment of the present invention.

FIG. 10B illustrates a windshield curtain 14b in accordance with a third embodiment of the present invention. The windshield curtain 14b of the third embodiment is similar to the second embodiment (FIG. 10A), except that the windshield curtain of the third embodiment (FIG. 10B) includes vertical pleats 150b on the driver side 130b and the passenger side 132b of the curtain.

The pleats 150b may provide an increased depth so that the windshield curtain 14b may occupy a desired space in the vehicle. The windshield curtain 14b may thus provide an improved reaction surface for absorbing impacts with the curtain. The pleats 150b may also allow the curtain 14b to provide coverage over a desired area of the vehicle. The pleats 150b may be formed on the first panel (not shown), on the second panel 82b, or on both the first and second panels. Stitching 154b maintains the pleats 150b. It should be noted that, in the embodiment of FIG. 10B, additional stitching, identified at 180b, maintains ends of the pleats 150b that are spaced away the perimeter connection 86b.

Figures 10C, 10D:
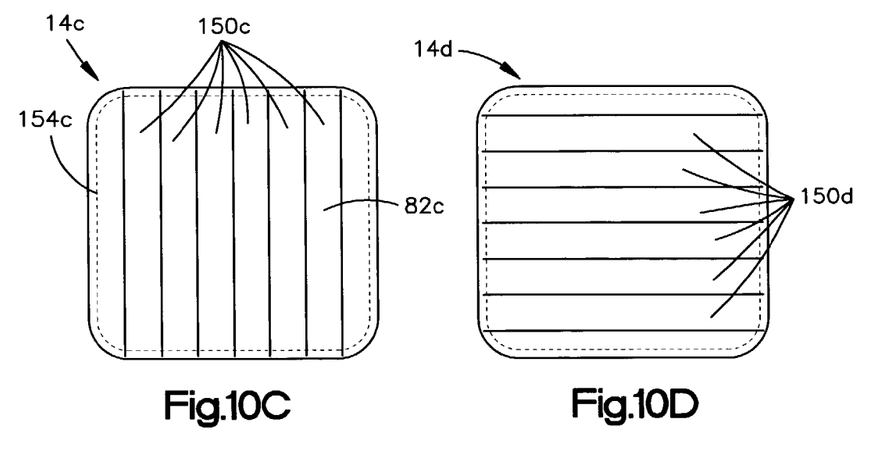
FIG. 10C is a schematic front view of an apparatus for helping to protect a vehicle occupant, according to a fourth embodiment of the present invention.
FIG. 10D is a schematic front view of an apparatus for helping to protect a vehicle occupant, according to a fifth embodiment of the present invention.

FIG. 10C illustrates a windshield curtain 14c in accordance with a fourth embodiment of the present invention. The windshield curtain 14c of the fourth embodiment is similar to the previous embodiments (FIGS. 1–10A), except that the windshield curtain of the fourth embodiment (FIG. 10C) provides coverage on a driver side only or on a passenger side only of a vehicle.

As shown in FIG. 10C, the windshield curtain 14c has a generally rectangular configuration. This configuration may vary depending on factors such as vehicle architecture. In the fourth embodiment, the pleats 150c have a vertical orientation and extend between opposite edges of the curtain 14c. It should be noted that the pleats of any of the embodiments disclosed herein may have such an extent. The pleats 150c may be formed on the first panel (not shown), on the second panel 82c, or on both the first and second panels. Stitching 154c maintains the pleats 150c.

The pleats 150c may provide an increased depth so that the windshield curtain 14c may occupy a desired space in the vehicle. The windshield curtain 14c may thus provide an improved reaction surface for absorbing impacts with the curtain. The pleats 150c may also allow the curtain 14c to provide coverage over a desired area of the vehicle. The windshield curtain 14c may serve these functions on either the driver side or the passenger side of the vehicle. The configuration of the curtain 14c, in terms of size and/or shape may vary depending on the side of the vehicle for which the curtain is provided.

FIG. 10D illustrates a windshield curtain 14d in accordance with a fifth embodiment of the present invention. The windshield curtain 14d of the fifth embodiment is identical to the windshield curtain of the fourth embodiment (FIG. 10C), except that the pleats 150d have a generally horizontal orientation.

From the above description of the invention, those skilled in the art will perceive improvements, changes and modifications. For example, the structural configuration of the vehicle (e.g., the roof, headliner, trim piece, A pillars, windshield, instrument panel, and hood) depicted in the illustrated embodiments is a simplified schematic example of a structural configuration in which the present invention may be implemented. This illustrated vehicle configuration is not meant to limit or otherwise preclude implementation of the present invention in a vehicle in which the structural configuration may differ from the structure depicted herein. Also, those skilled in the art will appreciate that the pleated construction disclosed may be implemented in inflatable protection devices other than a windshield curtain, such as inflatable front impact air bags, inflatable knee bolsters, side impact air bags, or side curtains. These and other such improvements, changes and modifications within the skill of the art are intended to be covered by the appended claims.

Having described the invention, the following is claimed:

1. Apparatus for helping to protect an occupant of a vehicle that has a roof, a windshield, and an instrument panel, said apparatus comprising:
   an inflatable windshield curtain inflatable away from the roof to a position between the windshield and a vehicle occupant and between the instrument panel and the vehicle occupant; and
   an inflation fluid source actuatable to provide inflation fluid for inflating said windshield curtain;
   said windshield curtain comprising overlying panels interconnected to define an inflatable volume of said windshield curtain, one of said panels having a pleated portion comprising at least one pleat, said at least one pleat comprising portions of the panel that are folded to overlie each other and interconnected at opposite ends of said at least one pleat, portions of said at least one pleat between the connections unfolding into engagement with the instrument panel upon inflation of said windshield curtain and following the contour of the instrument panel so that the instrument panel forms a reaction surface for the windshield curtain.

2. Apparatus as recited in claim 1, wherein each of said first and second panels has a length, said second panel having a length that is greater than the length of said first panel, said pleated portion being formed in said second panel by folding said second panel along fold lines extending generally perpendicular to said length, said pleated portion reducing the overall length of said second panel to be about equal to the length of said first panel.

3. Apparatus as recited in claim 1, wherein said windshield curtain has a width, a length extending perpendicular to said width, and a depth extending perpendicular to said length and said width, said portions of said at least one pleat when unfolded expanding in the direction of said depth when said windshield curtain is inflated.

4. Apparatus as recited in claim 3, wherein said windshield curtain is inflatable toward the instrument panel of the vehicle, said pleated portion of said windshield curtain being inflatable away from the windshield between the instrument panel and a vehicle occupant.

5. Apparatus as recited in claim 4, wherein said windshield curtain provides an inflated protection wall extending from the vehicle roof down to a position adjacent a front surface and below an upper surface of the instrument panel.

6. Apparatus as recited in claim 5, wherein said windshield curtain when inflated extends from a driver side A pillar to a passenger side A pillar.

7. Apparatus as recited in claim 1, further comprising a driver side pleated portion is positioned on a driver side of the vehicle when said windshield curtain is inflated.

8. Apparatus as recited in claim 1, wherein said pleated portion is positioned on a passenger side of the vehicle when said windshield curtain is inflated.

9. Apparatus as recited in claim 1, wherein said at least one pleat extends in a generally vertical direction in the vehicle when said windshield curtain is inflated.

10. Apparatus as recited in claim 1, wherein said at least one pleat extends in a generally horizontal direction in the vehicle when said windshield curtain is inflated.

11. The apparatus recited in claim 1, wherein said panels comprise at least one non-pleated portion for limiting the inflated depth of said windshield curtain in areas spaced from the instrument panel.

12. Apparatus for helping to protect an occupant of a vehicle that has a roof, a windshield, and an instrument panel, said apparatus comprising:

an inflatable windshield curtain inflatable away from the vehicle roof, said windshield curtain having a driver side portion inflatable between the windshield and a driver side occupant of the vehicle and a passenger side portion inflatable between the windshield and a passenger side occupant of the vehicle; and an inflation fluid source actuatable to provide inflation fluid for inflating said windshield curtain;

said passenger side portion having a pleated construction and being configured to extend vertically below a lower extent of said driver side portion when inflated.

13. The apparatus recited in claim 12, wherein said windshield curtain has a depth measured between overlying panels of said windshield curtain when inflated, said pleated construction of said passenger side portion increasing the depth of said passenger side portion such that said passenger side portion engages and follows the contour of the windshield and instrument panel so that the windshield and instrument panel form reaction surfaces for the windshield curtain.

14. The apparatus recited in claim 12, wherein said windshield curtain has a depth measured between overlying panels of said windshield curtain when inflated, said pleated construction of said passenger side portion increasing the depth of said passenger side portion over the depth of said driver side portion.

* * * * *